US009397606B2

(12) United States Patent
Liebendorfer

(10) Patent No.: US 9,397,606 B2
(45) Date of Patent: *Jul. 19, 2016

(54) SYSTEM FOR MOUNTING A PHOTOVOLTAIC MODULE TO A SURFACE

(71) Applicant: UniRac, Inc., Albuquerque, NM (US)

(72) Inventor: John E. Liebendorfer, Albuquerque, NM (US)

(73) Assignee: UNIRAC, INC., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,932

(22) Filed: May 8, 2014

(65) Prior Publication Data

US 2014/0239137 A1  Aug. 28, 2014

Related U.S. Application Data

(63) Continuation of application No. 13/354,186, filed on Jan. 19, 2012, now Pat. No. 8,763,968, which is a continuation of application No. 12/848,716, filed on Aug. 2, 2010, now Pat. No. 8,128,044, which is a continuation of application No. 11/826,607, filed on Jul. 17, 2007, now Pat. No. 7,766,292, which is a continuation of application No. 10/116,384, filed on Apr. 4, 2002, now Pat. No. 7,260,918, which is a continuation-in-part of application No. 09/910,655, filed on Jul. 20, 2001, now Pat. No. 7,434,362.

(51) Int. Cl.
*H02S 20/23* (2014.01)
*F24J 2/52* (2006.01)
*E04F 13/08* (2006.01)
*H01L 31/042* (2014.01)
*F24J 2/46* (2006.01)

(52) U.S. Cl.
CPC ............... *H02S 20/23* (2014.12); *F24J 2/5205* (2013.01); *F24J 2/526* (2013.01); *F24J 2/5247* (2013.01); *F24J 2/5258* (2013.01); *H02S 20/00* (2013.01); *F24J 2002/4672* (2013.01); *F24J 2002/5215* (2013.01); *F24J 2002/5226* (2013.01); *Y02B 10/12* (2013.01); *Y02B 10/20* (2013.01); *Y02E 10/47* (2013.01); *Y02E 10/50* (2013.01)

(58) Field of Classification Search
CPC .......... E04G 3/26; Y02E 10/47; Y02B 10/12; Y02B 10/20; Y02B 10/50; F24J 2/5205; F24J 2/5247; F24J 2/5258; F24J 2/526; H02S 20/23
USPC ................. 248/237; 52/173.3, 506.6; 136/251
See application file for complete search history.

(56) References Cited

U.S. PATENT DOCUMENTS 8,191,321 B2 *  6/2012  Mcclellan et al. ........... 52/173.3
8,344,239 B2 *  1/2013  Plaisted ........................ 136/251

(Continued)

OTHER PUBLICATIONS

Decision on Appeal in Inter Partes Reexamination Control No. 95/001,706, U.S. Pat. No. 7,434,362, U.S. Patent and Trademark Office, 16 pages, Jul. 10, 2014.

(Continued)

*Primary Examiner* — Anita M King
(74) *Attorney, Agent, or Firm* — Crowell & Moring LLP

(57) ABSTRACT

A system for removably and adjustably mounting a device on an object is provided. The system for removably and adjustably mounting a device on an object, according to the present invention, includes an apparatus and method useful for removably and adjustably mounting one or more photovoltaic modules on an object such as a pole or roof, and includes one or more triple track rails. Also included are one or more connector brackets that are demountably attachable to the one or more triple track rails and to the object.

11 Claims, 10 Drawing Sheets

(56) References Cited

U.S. PATENT DOCUMENTS

| | | | | |
|---|---|---|---|---|
| 8,595,996 | B2* | 12/2013 | Korman et al. | 52/173.3 |
| 8,595,997 | B2* | 12/2013 | Wu | 52/173.3 |
| 8,640,400 | B2* | 2/2014 | Liebendorfer | 52/173.3 |
| 8,695,290 | B1* | 4/2014 | Kim et al. | 52/173.3 |
| 2011/0126881 | A1* | 6/2011 | Hong et al. | 136/244 |

OTHER PUBLICATIONS

Decision on Appeal in Inter Partes Reexamination Control No. 95/001,727, U.S. Pat. No. 7,260,918, U.S. Patent and Trademark Office, 21 pages, Dec. 10, 2014.

* cited by examiner

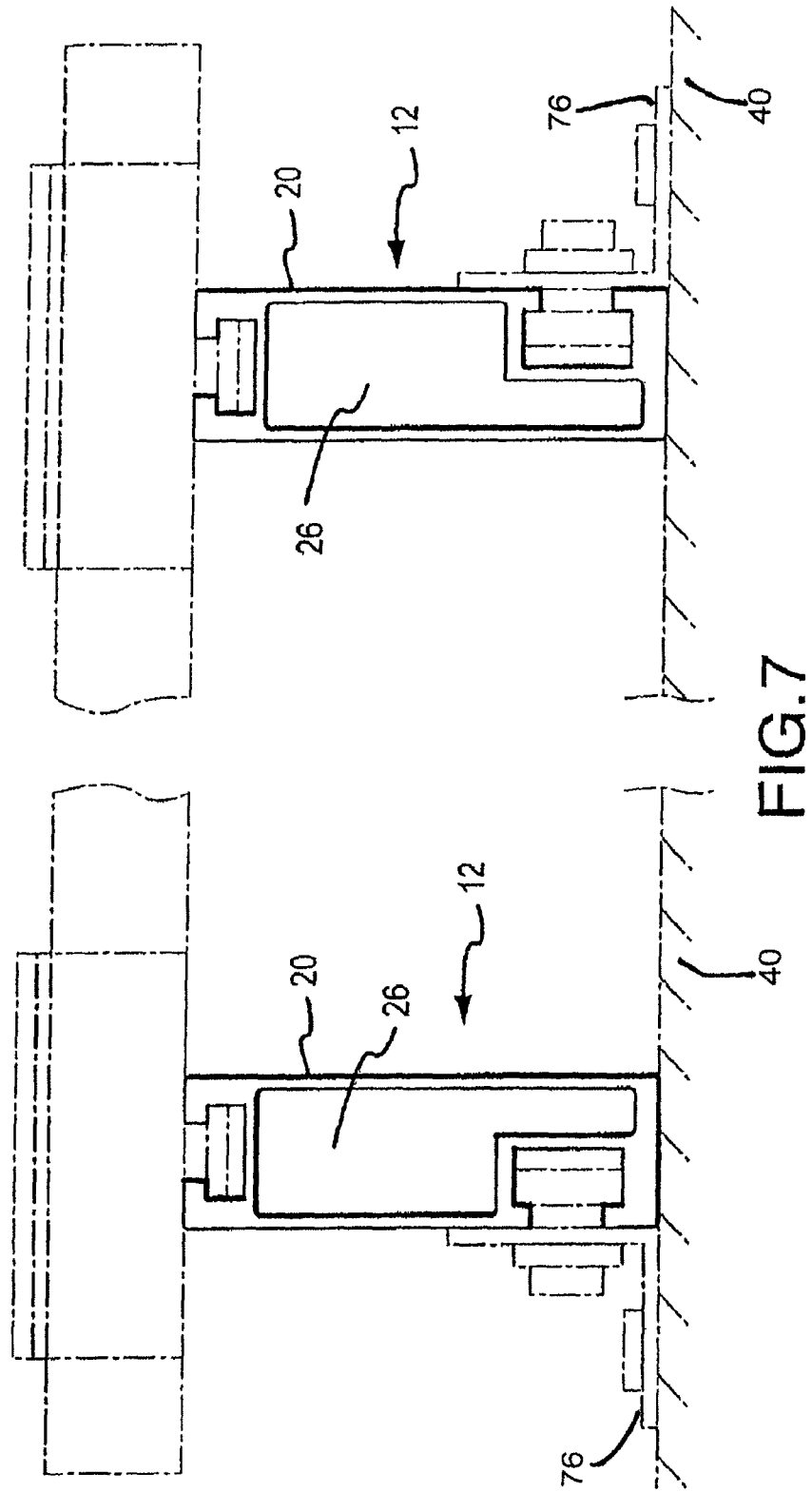

SYSTEM FOR MOUNTING A PHOTOVOLTAIC MODULE TO A SURFACE

CROSS-REFERENCE TO RELATED APPLICATIONS

This application is a continuation of prior U.S. application Ser. No. 13/354,186 filed on Jan. 19, 2012, which is a continuation of the application filed Aug. 2, 2010, application Ser. No. 12/848,716, now U.S. Pat. No. 8,128,044, which is a continuation of the application filed Jul. 17, 2007, application Ser. No. 11/826,607, now U.S. Pat. No. 7,766,292, which is a continuation of the application filed Apr. 4, 2002, application Ser. No. 10/116,384, now U.S. Pat. No. 7,260,918, which is a continuation-in-part of the application filed on Jul. 20, 2001, application Ser. No. 09/910,655, now U.S. Pat. No. 7,434,362, the disclosures of which are hereby incorporated by reference herein.

FIELD OF THE INVENTION

The present invention pertains generally to an apparatus and method for removably and adjustably mounting a device on a surface. More particularly, the new and useful invention claimed in this document pertains to an system for securely, safely, yet quickly mounting one or more photovoltaic devices onto a surface including, but not limited to, a roof. The present invention is particularly, but not exclusively, useful for removably attaching one or more photovoltaic modules, panels and arrays to a footing, footing grid, roof, pole, or any other surface, implement or object (collectively, "object" or "objects").

BACKGROUND OF THE INVENTION

Mounting devices to objects that are, or maybe, exposed to unpredictable and varying force vectors caused by wind, rain, and other elements of weather present technical problems often difficult to solve. A long standing and unsolved challenge in the solar energy industry, for example, has been resolving how best to mount panels, modules and arrays of photovoltaic devices (collectively, "module" or "modules") on surfaces not only securely and safely, but also quickly. The obverse problem also is significant to the industry, namely safely removing or reconfiguring a module that has been installed on a surface.

Solar energy radiation from the sun is capable of producing heat, causing chemical reactions, or generating electricity. The sun is an extremely powerful energy source, and solar radiation is by far the largest source of energy received by Earth, but its intensity at the Earth's surface is comparatively low. This is partly because Earth's atmosphere and its clouds absorb or scatter as much as 54 percent of all incoming sunlight. Solar energy, however, due to technological improvements in the manner of collecting the potential energy, has become increasingly attractive as an energy source: it is inexhaustible in supply, and non-polluting, both in stark contrast to fossil-fuel sources like coal, oil, and natural gas.

Sunlight reaching earth consists of approximately 50 percent visible light, 45 percent infrared radiation, and small amounts of ultraviolet light and other forms of electromagnetic radiation. Radiation is convertible either into thermal energy or directly into electricity by photovoltaic cells. In photovoltaic cells, a small electrical voltage is generated when light strikes the junction between a metal and a semiconductor or a junction between two different semiconductors. Although the voltage generated from a single photovoltaic cell typically is only a fraction of a volt, by connecting large numbers of cells together into panels, modules and arrays, significant electric power can be generated. To harness radiation for direct generation of electricity using cells collected into panels, modules and arrays, a number of apparatus and methods for using and installing the apparatus have been devised on which to mount modules on surfaces exposed to the radiation. The construction, installation, and use of such apparatus present a number of unsolved problems.

A wide variety of racks, frames and associated hardware have been proposed to mount modules on objects. Some solutions have proposed modifications of the shape, structure and size of components of a module to achieve more rapid and secure mounting. Other solutions have proposed altering the construct and design of hardware associated with installing racks, framing, and footings into a footing grid on which modules are mounted. As used in this document the term "footing grid" includes at least a network of keepers often, but not exclusively, L-shaped and formed with at least one hole in each extension of the "L." The keepers are connectable to a surface and are formed and shaped to permit attachment of other hardware components such as rails and frames on which modules may be attached.

Prior approaches suggested for mounting a module on an object include significant limitations and problems. A serious challenge to providing a useful apparatus and method for mounting a module on a surface arises from the variety of sizes and shapes of the modules, as well as the varying number of modules that might be required in a given situation. Another challenge that earlier suggestions did not overcome is the variety of surfaces on which modules may or must be mounted, including roofs, tops and sides of poles, the ground, and other locations. Earlier solutions, therefore, required construction of custom built racks to fit each of the enumerable iterations of the sizes and shapes of modules.

Many earlier suggestions for mounting panels, modules and arrays of photovoltaic devices on surfaces are cumbersome, unsafe, and not easily assembled or reconfigured. Also, none of the solutions provided an apparatus, and method for installing the apparatus, that would be universal. The term "universal" refers to an apparatus and method for mounting modules on a wide variety of objects that not only accommodate all known shapes, configurations, and numbers of modules, but also permit installation top down as well as bottom up. In the industry associated with installation of photovoltaic modules, the term "top down" refers to mounting photovoltaic modules on structures such as frames and rails that are attached first to the footing and on the surface on which the module is to be mounted before the module is attached to the frames or rails. For example, in the case of a module to be mounted on a building, one or more rails first would be attached to a footing grid that earlier has been attached to the surface, in this instance the roof; thereafter, one or more modules would be attached to the rails. Hardware that secures the module to the rails is attached from the top, or front, of the module. The term "bottom up" refers to positioning a photovoltaic module by first attaching the module to the footing grid and to the roof or other surface. In bottom up mounting, hardware used to secure the module to the rail is attached from the bottom or back of the module. The uniqueness of each installation, an installer's preferences, and the particular module all will determine whether a top down or bottom up installation is used. Significantly, none of the currently available apparatus for mounting photovoltaic modules to a surface allow installation both top down and bottom up using the same rail system.

Another limitation of current approaches for mounting photovoltaic modules to a surface is the excessive number and variety of hardware parts and components that are required to assemble a frame or rail system. Each module or combination of modules installed may present different shapes, sizes and configurations, thus requiring a unique combination of mounting hardware.

Still another unresolved problem arises from the varying shapes, sizes and configurations of modules. The arrangement of the modules on a surface such as a roof may not be dimensionally consistent with the location of rafters underneath the roof into which hardware must be inserted to hold the footing grid and rails.

Still another limitation of present apparatus for assembling and mounting modules on surfaces is the absence of a system and apparatus that permits easily adjusting and readjusting of the location on a rail on which the module may be positioned.

Therefore, a previously unaddressed need exists in the industry for a new and useful system for positioning a device such as a photovoltaic panels, modules and arrays of photovoltaic devices on a surface such as a roof, pole or other surface. Particularly, there is a significant need for a method and apparatus for mounting one or more photovoltaic modules safely, reliably, yet quickly on a surface; removing or reconfiguring the modules just as safely, reliably and quickly; and providing a system that is adjustable and expandable to allow a variety of dimensions and configurations.

SUMMARY OF THE INVENTION

Given the conventional solutions for solving the problems associated with removably and adjustably mounting a device such as a module having any of size and shape on a wide variety of surfaces; and of mounting varying shapes, sizes and configurations of modules on a surface such as a roof that may not be dimensionally consistent with the location of rafters underneath the roof into which hardware must be inserted to hold the footing grid and rails; and of reducing the number and variety of different hardware components that installers must use to install modules, it would be desirable, and of considerable advantage, to provide an interrelated system for quickly and safely mounting a module on a surface that overcomes those problems.

The present invention provides numerous advantages in connection with mounting, attaching, adjusting the configuration of one or more modules, and removing the one or more modules from a surface in a safe, reliable, yet rapid manner. At least one of the advantages of the present invention is that it provides an apparatus, and a method of installing the apparatus, that allows installation both top down and bottom up using the same rail system. The present invention also significantly reduces the number and variety of hardware parts and components needed to assemble the apparatus. In addition, the system for removably and adjustably mounting a device on a surface provides universal hardware, permitting installation of a module on a surface either in any direction or configuration.

In addition, the present invention also allows assembly of photovoltaic modules of any size or shape on a variety of surfaces, while insuring that the footing grid remains securely attached to the surface. The unique dual track rail of the present invention, in combination with the novel clamps of the present invention, also permit ready slidable adjusting and readjusting of the location on a rail on which the module may be positioned. Equally significant, the present invention provides an apparatus and method for removably and adjustably mounting a device such as a module on a surface which respectively are easy to use and to practice, and which are cost effective for their intended purposes.

These and other advantages are achieved in the present invention by providing a system for removably and adjustably mounting a device on a surface that includes a rail formed with at least two tracks, and one or more clamps for interconnecting the system. Each of the tracks includes a channel extending the length of the rail. A slot also extending the length of the rail is formed in each channel. The slots are arranged at approximately a right angle to each other. The unique channel construction helps achieve the advantages of the present invention by making the rail adjustable to a wide variety of modules. To add universality of application to the present invention, the system for removably and adjustably mounting a device on a surface also includes at least two different constructions of clamps for top down mounting. One configuration of the clamps is a duct with at least two opposing shoulders substantially perpendicular to one another, and is used primarily for mounting adjacent edges of different modules to a rail. Another configuration of the clamp is a leg having a descending member and an ascending member extending in opposite directions. A lip, or fin, is provided on the two opposing shoulders, as well as on the ascending member, to provide torsional clamping power on the edges of modules. The leg-shaped clamp is an end clamp, used primarily to mount an edge of a module to a rail. The clamps maybe repositioned along the rail formed with at least two tracks, making the system easily and quickly reconfigurable.

Further optimizations in connection with the present invention is achieved by including features and elements desirable for increasing the range and variety of different applications and environments in which the present invention may be used. In at least one such additional optimization of the present invention, an apparatus and method for positioning a module on an object includes a rail having at least three tracks (a "triple track rail" or "triple track rails") and at least one connector bracket. Each triple track rail includes a proximal end, a distal end, and opposing sides. In addition, each triple track rail includes a hollow chamber extending the length of the triple track rail between the distal end and proximal end of the triple track rail. A cavity is formed through one of the opposing sides of the rail. The apparatus and method for positioning a module on an object also includes at least one connector bracket. The connector bracket includes a first flange and a second flange that are positioned substantially at a right angle to each other. The first flange is formed with a bore for insertion of a fastener to connect the first flange to a module. The term "fastener" as used in this document includes any number of means for fastening, including without limitation a bolt, screw, clamp, dowel, rivet, and other means for fastening through a bore. The first flange also is formed with a lip at one end. An elbow extends monolithically from the second flange at substantially a right angle to the second flange. An end of the elbow not extending monolithically from the second flange is insertable into the cavity formed in the hollow chamber for assisting in securely mounting the triple track rail on an object. Also, at least one semicircular groove is formed in at least one of the opposing sides of the rail. The semicircular groove is useful in assisting an installer who seeks to drill additional holes through the opposing wall to secure a mounting device in which electrical or other lines may be secured.

The advantages and objects of such an apparatus and method for positioning a module on an object include additional advantages in connection with mounting, attaching, adjusting, and detaching a rail to or from one or more objects and modules, and for removing the one or more modules from a surface and object in a safe, reliable, yet rapid manner. At least one advantage of the present invention is an apparatus, and a method of installing the apparatus, is that it allows installation both top down and bottom up using a rail system that includes a triple track rail in combination with the connector bracket of the present invention. The present invention also significantly reduces the number and variety of hardware parts and components needed to assemble the apparatus and connect the apparatus to an object other than fasteners. In the vast majority of installations of a module, the connector bracket of the present invention is the only additional item of hardware needed to interconnect a rail, a module, a keeper, grid and object. In addition, the system provided by the present invention provides universal hardware, permitting installation of a module on a surface and object either in any direction or configuration.

The present invention also allows assembly of photovoltaic modules of any size or shape on a variety of surfaces. The unique triple track rail of the present invention, in combination with the novel connector bracket of the present invention, permit rapid installation as well as rapid adjustments and relocation of a module and a rail system. Equally significant, the present invention is easy to use and to practice, and is cost effective for the intended purposes.

The advantages, objects, and features of the present invention will become apparent to those skilled in the art when read in conjunction with the accompanying following description, drawing figures, and appended claims. It is clear, however, from the foregoing that the claimed subject matter as a whole, including the structure of the apparatus, and the cooperation of the elements of the apparatus, as well as the method for installing and using the apparatus, combine to result in a number of unexpected advantages and utilities of the present invention.

The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

As used in this document, the term "device" is not limited to the photovoltaic environment. For example, but not by way of limitation, the term includes any device capable of generating power, but may also be a device capable of holding liquids, gases or admixtures of solids. A device may be mounted on a surface which may include the roof or wall of a building, a pole, or any other surface. The shape of the device is not material to the present invention, and may be rectangular, circular, or any other shape or configuration.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

BRIEF DESCRIPTION OF THE DRAWINGS

FIG. 7 shows additional end views of a rail in accordance with the present invention;

DESCRIPTION OF THE PREFERRED EMBODIMENTS

Briefly, the present invention provides a system for removably and adjustably mounting a device on a surface. The invention includes one or more dual track rails and one or more unique clamps that may be interconnected to a footing grid.

Figure 1:
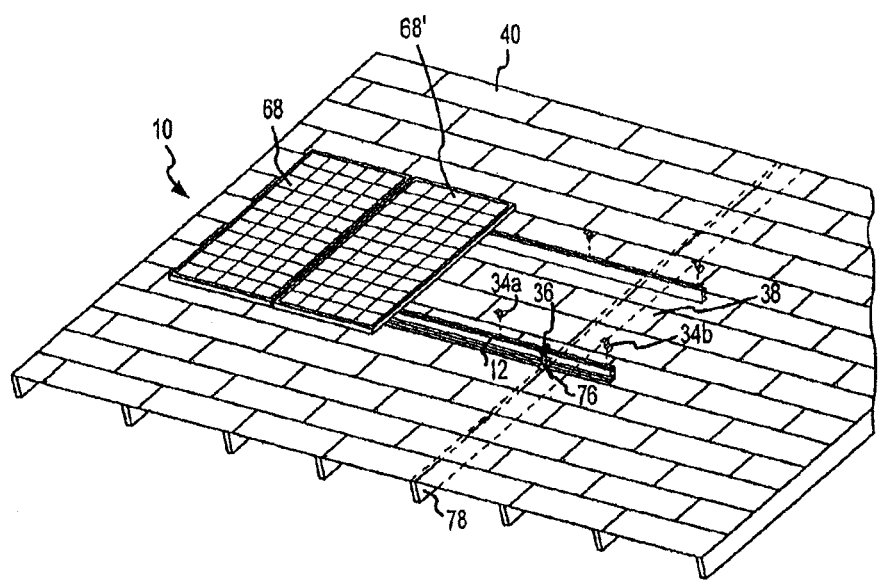
FIG. 1 is a perspective view of the system for removably and adjustably mounting a device on a surface in an operative environment as an apparatus for removably and adjustably mounting one or more photovoltaic modules on a surface such as a roof as shown.
Figure 3:
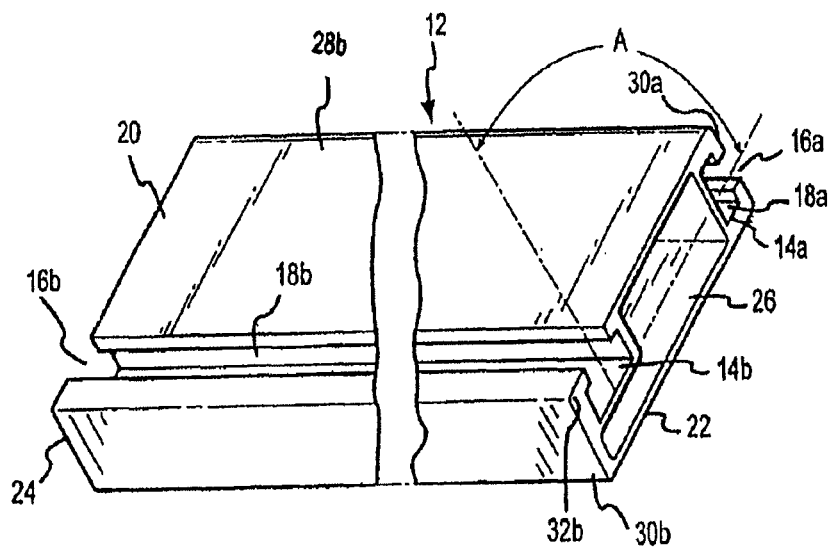
FIG. 3 is a perspective view of a rail in accordance with the present invention.
Figure 5:
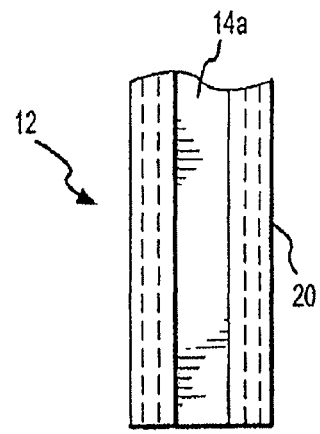
FIG. 5 is a top view of a rail in accordance with the present invention.
Figure 6:
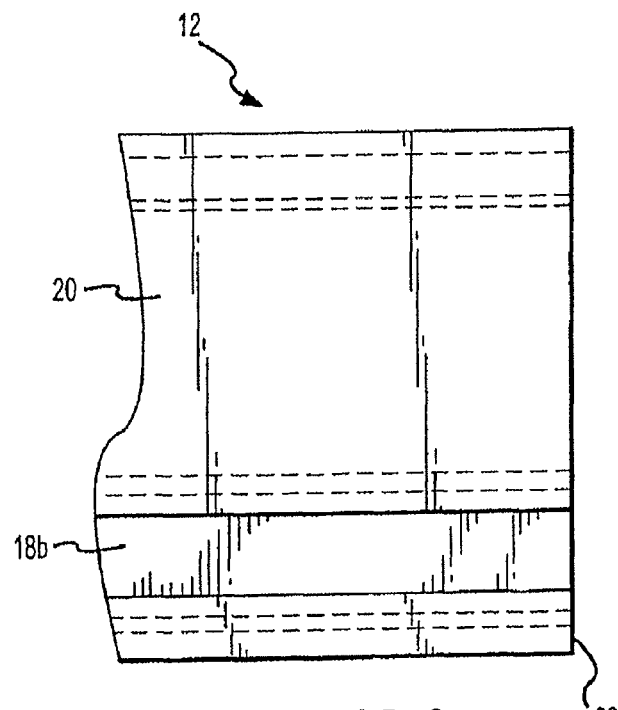
FIG. 6 is a side view of a rail in accordance with the present invention.
Figure 4:
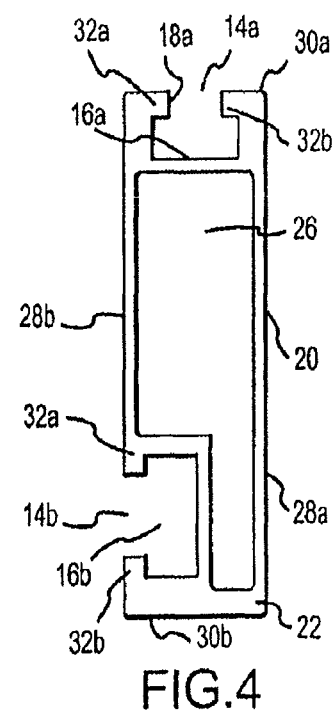
FIG. 4 is an end view of a rail in accordance with the present invention.
Figure 8:
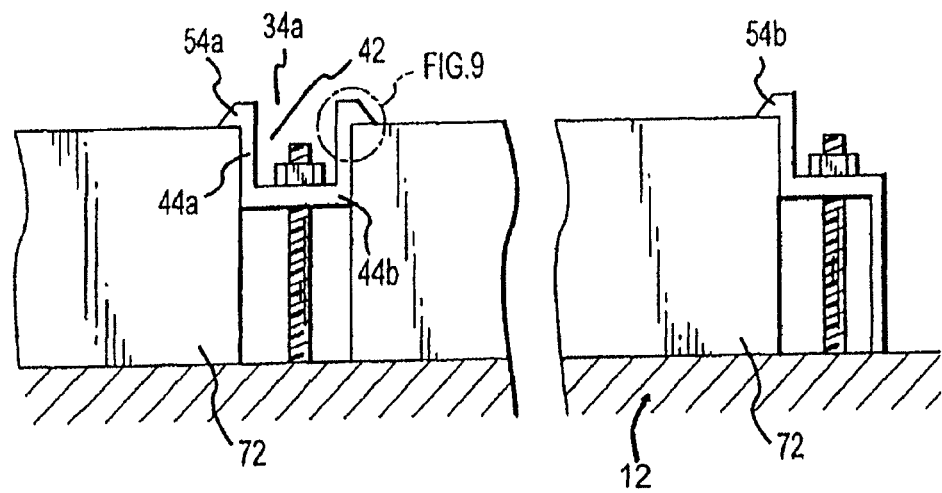
FIG. 8 shows a front view of clamps in accordance with the present invention.

FIG. 1 illustrates the system for removably and adjustably mounting a device on a surface in an operative environment. As shown, the present invention is an apparatus for removably and adjustably mounting one or more photovoltaic modules on a surface such as a roof. Referring initially to FIG. 1, the system for removably and adjustably mounting a device on a surface is shown and generally designated 10. The system for removably and adjustably mounting a device on a surface 10, according to the present invention, includes at least one rail 12. In a preferred embodiment of the present invention, at least one rail 12 is formed of extruded aluminum, but the material used is not a material consideration to the present invention. As shown perhaps best by cross-reference between FIGS. 3-7, at least one rail 12 is formed with at least two tracks 14a,b. Both of at least two tracks 14a,b include a channel 16a,b, perhaps best shown in FIGS. 3 and 4, extending the length of at least one rail 12 substantially coincident with the longitudinal axis of at least one rail 12. Each channel 16a,b in at least two tracks 14a,b is formed with a slot 18a,b. Slots 18a,b extend the length of at least one rail 12 substantially coincident with the longitudinal axis of at least one rail 12. In addition, in accordance with the present invention, slot 18a in channel 16a of at least one rail 12 is formed substantially at a right angle A to slot 18b in any other of at least two tracks 14a,b, as shown diagrammatically in FIG. 3. As shown in FIGS. 3, 4 and 7, at least one rail 12 is formed with a body 20. Body has a proximal end 22, a distal end 24, and a hollow chamber 26 between proximal end 22 and distal end 24 of body 20. Hollow chamber 26 contributes to the light weight yet structural rigidity of at least one rail, and therefore to its ease of handling during installation of system for removably and adjustably mounting a device on a surface 10. In a preferred embodiment of the present invention, at least one rail 12 also is formed with opposing sides 28a,b and opposing shoulders 30a,b.

As further shown in FIG. 3, body 20 includes channel 16b formed in opposing side 28b for slidably engaging the rail on hardware described below. Channel 16b is formed with slot 18b extending along the longitudinal axis of at least one rail 12. In a preferred embodiment of the present invention, slot 18a,b also includes opposing jaws 32a,b monolithically protruding from slot 18a,b substantially along the longitudinal axis of the channel 16a,b. Body 20 further includes channel 16a. Channel 16a is formed in opposing shoulder 30a as shown in FIGS. 3 and 4. Channel 16a also contributes, in combination with channel 16b, to making at least one rail 12 slidably engageable with the one or more footings 36. As will be apparent to a person skilled in the art, channel 16a and channel 16b enable at least one rail 12 to be slidable engageable with one or more footings 36.

As also shown by cross-reference among FIGS. 8-11, a system for removably and adjustably mounting a device on a surface 10 also includes one or more clamps 34a,b. As shown best by reference to FIGS. 8 and 10, one or more clamps 34a are formed as a duct 42. Duct 42 includes at least two opposing flanges 44a,b. Opposing flanges 44a,b of one or more clamps 34a are substantially perpendicular to one another. One or more clamps 34a may also be described as formed with a plate 46 and monolithic opposing side walls 48 extending substantially in the same direction at substantially right angles B from plate 46. Opposing side walls 48 include a lower inner edge 50 and an upper face 52. A fin 54 extends from upper face 52 substantially along the longitudinal axis of one or more clamps 34a,b. One or more clamps 34a also includes at least one hole 56 through plate 46 for securing one or more clamps 34a as described below.

Figure 11:
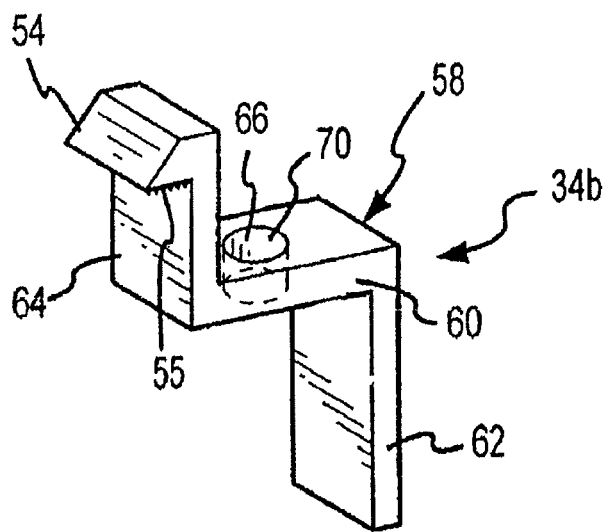
FIG. 11 is a perspective view of yet another embodiment of the clamp.

In an alternative embodiment of one or more clamps, one or more clamps 34b is formed with a leg 58 having a base 60 as shown best in FIG. 11. From base 60 of leg 58 a descending member 62 monolithically extends from base 60. In addition, from base 60 of leg 58 an ascending member 64 monolithically extends from base 60 in a direction substantially opposite the direction of descending member 62. As also shown in FIG. 11, one or more clamps 34b include means 66 for connecting base 60 to at least one rail 12. One or more clamps 34b also includes means 70 for variably positioning one or more clamps 34b in channel 16a of at least one rail 12.

Figure 2:
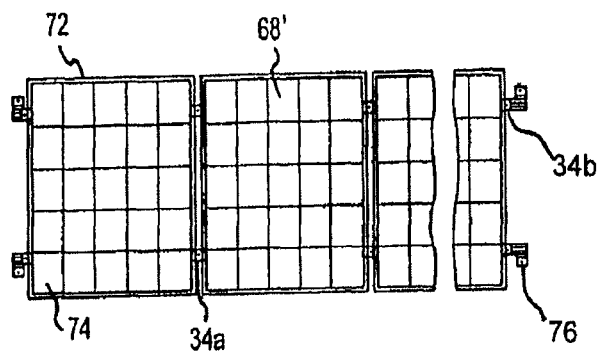
FIG. 2 is a top view of a module installed on a surface.

FIG. 1 also shows a device 68 that may be mounted on surface 40 using the present invention. In a preferred embodiment of the present invention, device 68 is a photovoltaic module 68', also shown in FIG. 2. Photovoltaic module 68' is formed with an edge 72. In a photovoltaic environment for application of the present invention, edge 72 holds one or more photovoltaic panels 74. As also shown best in FIGS. 1 and 2, footing grid 38 includes one or more footings 36. In combination, the one or more footings 36 compose a network of keepers 76. In the preferred embodiment of the present invention, each of the network of keepers 76 is L-shaped and constructed of metal. Neither the shape nor material of the keepers 76 is a material limitation of the present invention. Each of keepers 76 may be fastened to surface 40. If surface 40 is a roof of a building, keepers 76 may be attached to surface 40 by inserting lag bolts (not shown) through keepers 76 into rafters 78 beneath surface 40. Once installed, keepers 76 form a grid, as shown in FIG. 1, on which at least one rail 12 of the present invention is removably connectable.

Figure 9:
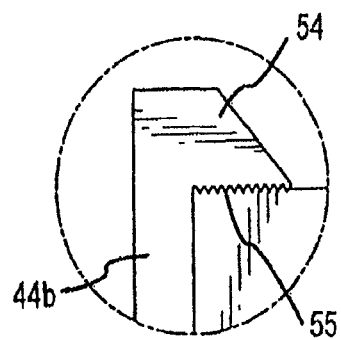
FIG. 9 shows a blown up view of the fin of a clamp as noted in FIG. 8.
Figure 10:
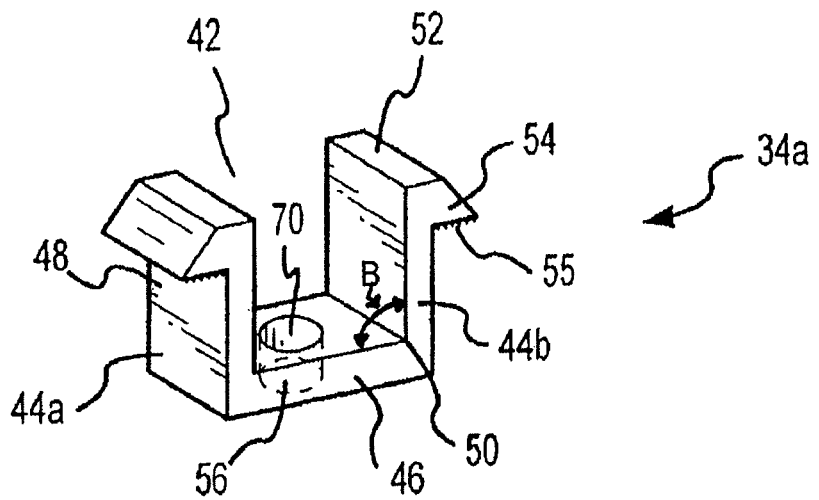
FIG. 10 is a perspective view of one embodiment of the clamp.

Using the principal embodiment of the present invention, in operation one or more clamps 34a,b are variably positionable not only on at least one rail 12, but also on footing grid 38 for demountably securing module 68' to footing grid 38, as shown by reference to FIG. 1. As shown in FIG. 9, a preferred embodiment of fin 54a,b includes a serrated surface 55 that grips edge 72 of module 68' with significant torsional rigidity, but because of the use of conventional hardware for attaching one or more clamps 34a,b to edge 72 of module 68', one or more clamps 34a,b are quickly and safely repositionable. As further shown by cross-reference between FIGS. 1 and 4, channel 16a, during installation, may be slidably engaged with at least one rail 12 and to footing grid 38. As shown in FIG. 4, slot 18a includes opposing jaws 32a,b monolithically protruding from slot 18a substantially along the longitudinal axis of channel 16a. Jaws 32a,b contribute to making one or more clamps 34a,b slidable and removably engageable, and therefore allow the present invention to be not only mounted, but reconfigured on surface 40. Channel 16b also contributes, in combination with first channel 16a, to making at least one rail 12 slidably engageable, and repositionable, with one or more clamps 34a,b. As will be apparent to a person skilled in the art, channel 16a and channel 16b enable at least one rail 12 to be slidable engageable with not only one or more clamps 34a,b, but also with footers 36 comprising footing grid 38.

While the system for removably and adjustably mounting a device on a surface 10 as shown in drawing FIGS. 1 through 11 is one embodiment of the present invention, it is only one such embodiment of the invention, is not intended to be exclusive, and is not a limitation of the present invention. The particular a system for removably and adjustably mounting a device on a surface as shown and disclosed in detail in this instrument is fully capable of obtaining the objects and providing the advantages stated, but this disclosure is merely illustrative of the presently preferred embodiments of the invention, and no limitations are intended in connection with the details of construction, design or composition other than as provided and described in the appended claims.

Further optimizations in connection with the present invention are achieved by including features and elements desirable for increasing the range and variety of different applications and environments in which the present invention may be used. In at least one such additional optimization of the present invention, an apparatus and method for positioning a module on an object is provided. The present invention includes one or more rails having at least three rails (a "triple track rail" or "triple track rails") used in combination with at least one connector bracket.

Figure 12:
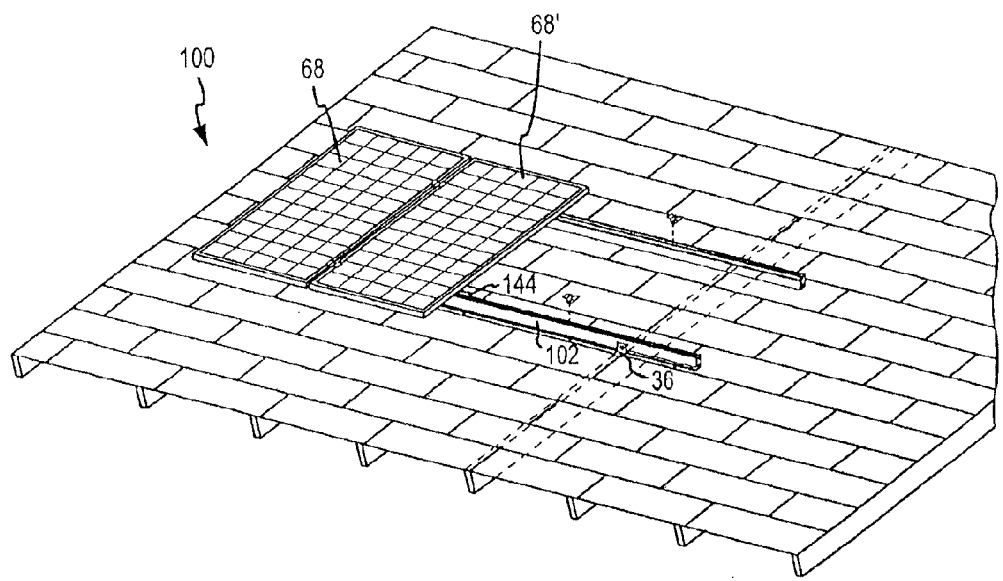
FIG. 12 is a perspective view of the apparatus and method for positioning a module on an object in an operative environment.

FIG. 12 illustrates the apparatus for positioning a module on an object in an operative environment. As shown, the present invention includes an apparatus for removably and adjustably mounting one or more photovoltaic modules on an object such as a pole or roof. Referring initially to FIG. 12, the apparatus for positioning a module on an object is shown and generally designated 100. The apparatus 100 for positioning a module 68' on an object, according to the present invention, includes at least one rail 102. In a preferred embodiment of the present invention, at least one rail 102 is formed of extruded aluminum, but neither the materials used nor the extrusion method of manufacture is material to the present invention.

Figure 13:
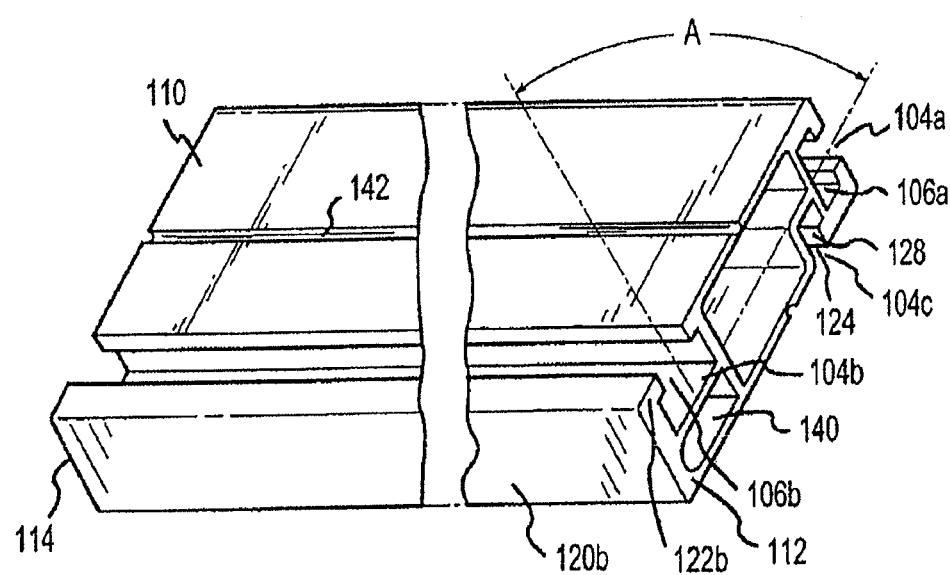
FIG. 13 is a perspective view of the triple track rail in accordance with the present invention.
Figure 14A:
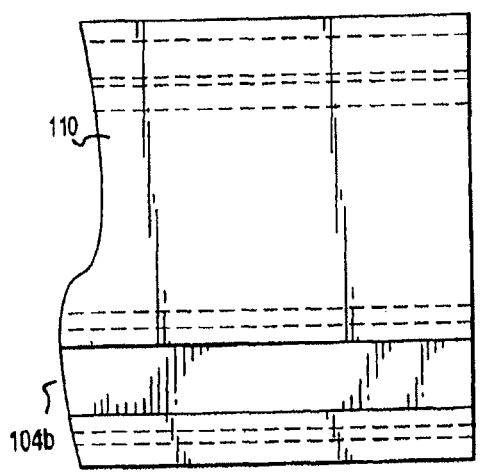
FIG. 14A is a side view of the triple track rail.
Figure 14B:
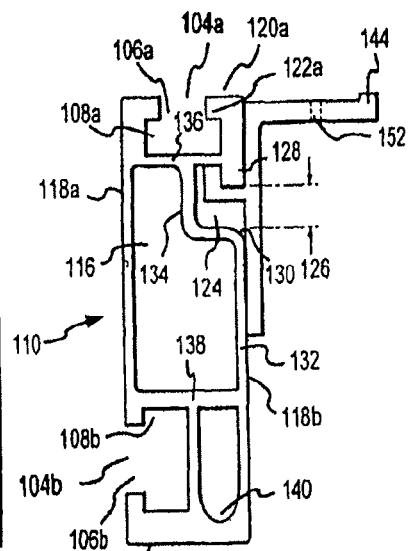
FIG. 14B is an end view of the triple track rail.

As shown perhaps best by cross-reference among FIGS. 13, 14A and 14B, at least one rail 102 is formed with at least three tracks 104*a,b,c*. Two of at least three tracks 104*a,b,c* include a channel 106*a,b*. For illustrative purposes, as best shown by cross-reference among FIGS. 13, 14A and 14B, two of the at least three tracks 104*a,b,c* are shown with channels 106*a,b* extending the length of at least one rail 102 substantially parallel to the longitudinal axis of at least one rail 102. Each channel 106*a,b* in at least two tracks 104*a,b* is formed with a slot 108*a,b* that for illustrative purposes are shown as slots 108*a,b*. Slot 108*a,b* extends the length of at least one rail 102 substantially parallel to the longitudinal axis of at least one rail 102. In addition, in accordance with the present invention, slot 108*a* in channel 106*a* of at least one rail 102 is formed substantially at a right angle A to slot 108*b* as shown diagrammatically in FIG. 13.

As shown in FIGS. 13, 14A and 14B, at least one rail 102 also is formed with a body 110. Body 110 has a proximal end 112, a distal end 114 as best shown in FIG. 13, and a hollow chamber 116 between proximal end 112 and distal end 114 of body 110 as best shown in FIG. 14B. Hollow chamber 116 contributes to the light weight yet structural rigidity of at least one rail, and therefore to its ease of handling during installation of apparatus while positioning a module 68' on an object. In a preferred embodiment of the present invention, as best shown in FIGS. 13 and 14B, at least one rail 102 also is formed with opposing sides 118*a,b* and opposing shoulders 120*a,b*. In operation, as further shown in FIGS. 14B and 15, tracks 104*a,b* permit at least one rail 102 to be slidably engageable on hardware described below.

In a preferred embodiment of the present invention, as shown by cross-reference between FIGS. 13 and 14B, slot 108*a,b* also includes opposing jaws 122*a,b* monolithically protruding from slot 108*a,b* substantially along the longitudinal axis of channel 106*a,b*. Channel 106*a* is formed in opposing shoulder 120*a* as shown in FIG. 14B. Channel 106*a* also contributes, in combination with channel 106*b*, to making at least one rail 102 slidably engageable with the one or more footers 36.

Apparatus for positioning a module on an object 100, as shown by cross-reference between FIGS. 13 and 14B, also includes a cavity 124 formed in body 110 of at least one rail 102. Cavity 124 is formed through at least one opposing side 118*a,b*, and for illustrative purposes is shown in FIG. 14B as being formed through at least one opposing side 118*b*. As also shown in FIG. 14B, an opening 126 is formed in opposing side 118*b*. Opening 126 in opposing side 118*b* is defined by a boss 128 also formed in opposing side 118*b* as well as by a shelf 130. In a preferred embodiment of the present invention, shelf 130 is formed monolithically from edge 132 in opposing side 118*b* that is opposite boss 128. Shelf 130 also extends monolithically into hollow chamber 116 to form a partition 134 that is best shown in FIG. 14B. Partition 134 merges monolithically into beam 136 in slot 108*a*, as best shown in FIG. 14B.

In addition, as also shown in FIG. 14B, a boom 138 extends through hollow chamber 116 between opposing sides 118*a,b* of rail 102. In operation, boom 138 resists compressive and similar forces applied against rail 102, thus enhancing the rigidity and longevity of apparatus for positioning a module on an object 100 when installed. Also in a preferred embodiment of the present invention, hollow chamber 116 is formed with a substantially semicircular passage 140, as best shown in FIGS. 13 and 14B. In operation, use of semicircular passage 140 instead of, for example, a passage having a rectangular shaped cross-section, also contributes to resisting compressive and other forces on apparatus for positioning a module on an object 100 after installation and mounting of rail 102 on module 68'. In a preferred embodiment of the present invention, at least one semicircular groove 142 is formed in at least one of the opposing sides 118*a,b* as shown in FIG. 13, for assisting an installer in drilling one or more additional holes (not shown) through opposing sides 118*a,b* for securing a mounting device (not shown) in which electrical or other lines may be secured.

Figure 15:
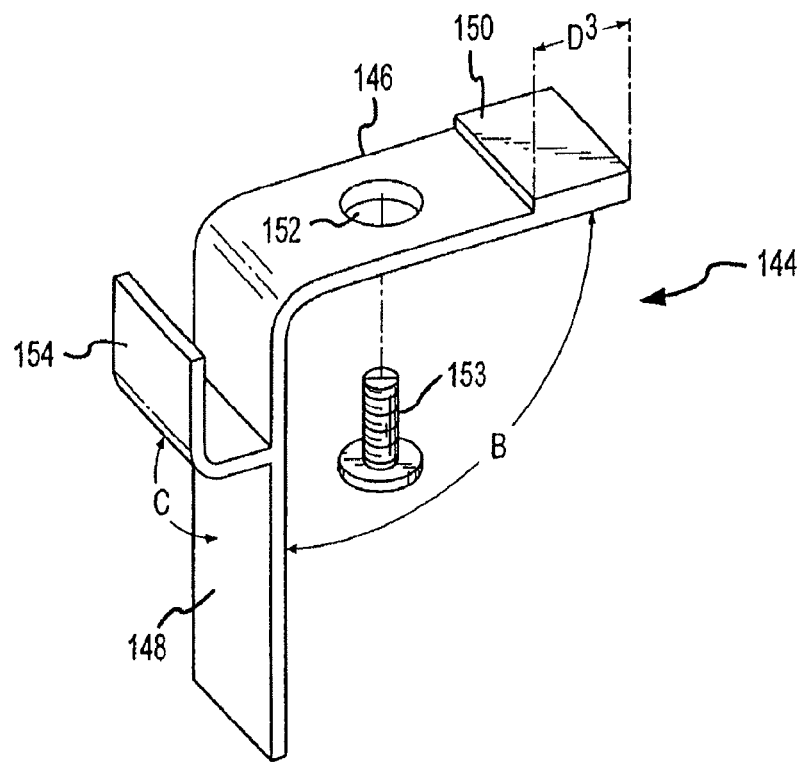
FIG. 15 is a perspective view of the connector bracket in accordance with the present invention.

Also included in the present invention of an apparatus for positioning a module on an object 100 are one or more connector brackets 144, as shown by cross-reference between FIGS. 14B and 15. One or more connector brackets 144 is formed to be demountably attachable to at least one rail 102 and to device 68 or module 68'. To achieve that object, one or more connector brackets 144 is monolithically formed with a first flange 146 and a second flange 148 substantially at a right angle as shown diagrammatically as Angle B in FIG. 15. First flange 146 is formed with a lip 150. In addition, first flange 146 is formed with a bore 152. In operation, bore 152 is provided for insertion of a fastener 153 through bore 152 to secure connector bracket 144 to device 68 or module 68'. In a preferred embodiment of the present invention, one or more connector brackets 144 further comprises an elbow 154. Elbow 154 is substantially L-shaped, and extends monolithically at substantially a right angle from second flange 148 as shown diagrammatically as Angle C in FIG. 15. Elbow 154 is shaped and configured for detachable engagement with cavity 124 formed in hollow chamber 116 of body 110. As shown best in FIG. 14B, elbow 154 is engageable with boss 128 as well as beam 136.

Figure 16:
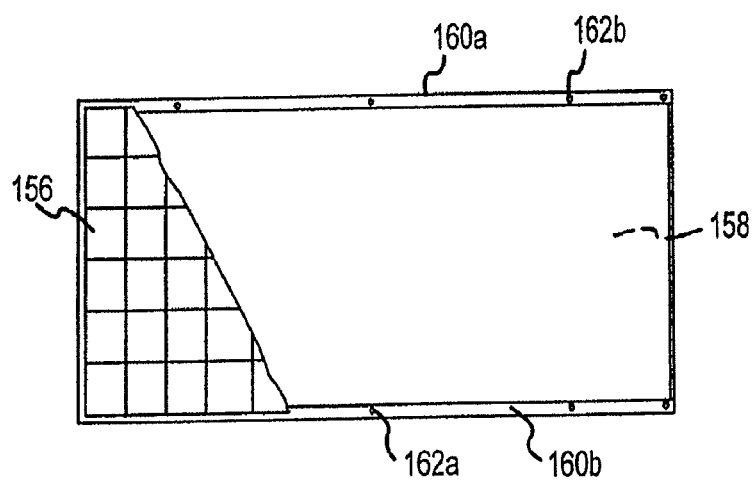
FIG. 16 is a top partially cut away view of a module.

In operation, as will be evident to one skilled in the art, the unique combination of one or more connector brackets 144, cavity 124, and three tracks 104 formed in at least one rail 102 (collectively, the "combined components") permits installation of apparatus for positioning a module on an object 100 in a wide variety of alternative ways. For example, as shown in FIG. 16, module 68' is typically formed with a collector side 156 and a back side 158. The term "collector side" refers generally to that side of module 68' that collects solar energy radiation from the sun. The term "back side" refers generally to that side of module 68' that does not collect solar energy radiation from the sun. The combined components permit an installer to select module 68' having at least collector side 156 and back side 158, constructed with at least two opposing edges 160*a,b* having a plurality of holes 162*a,b*. The combined components permit an installer to position module 68' collector side 156 down, mount at least one rail 102 on the back side 158 of module 68', and reposition the combined components collector side 156 up to install the combined components on the object 68. Alternatively, the combined components allow an installer to install the components either top down or bottom up.

What is claimed is:

1. A photovoltaic module mounting system, comprising:
   a rail, wherein the rail includes an elongated body with opposing shoulders and opposing sides, wherein a first track is defined by a one of the opposing shoulders, and wherein a second track is defined by a one of the opposing sides;

a clamp, wherein, in an operative configuration, the clamp is engaged with the first track and a photovoltaic module is mountable on the rail by the clamp;

a threaded fastener, wherein in an operative configuration, the threaded fastener is disposed through a hole defined by a base of the clamp and is disposed in the first track;

a keeper, wherein, in an operative configuration, the keeper is engaged with the second track;

wherein in the operative configuration, a bottom-most portion of the clamp is positioned in contact with a top surface of the rail and an entirety of a remaining portion of the clamp extends above the top surface of the rail.

2. The photovoltaic module mounting system according to claim 1, wherein in the operative configuration, a longitudinal axis of the clamp is disposed perpendicular to a length of the rail.

3. The photovoltaic module mounting system according to claim 1, wherein in the operative configuration, a plurality of discrete clamps are positioned along a length of the rail.

4. The photovoltaic module mounting system according to claim 1, wherein a vertical plane along a length of the rail extends through the first track and the second track.

5. The photovoltaic module mounting system according to claim 1, wherein the keeper is L-shaped.

6. The photovoltaic module mounting system according to claim 1, wherein a height of the elongated body is substantially greater than a width of the elongated body.

7. The photovoltaic module mounting system according to claim 1, wherein the elongated body of the rail has a proximal end, a distal end, and a hollow chamber therebetween.

8. The photovoltaic module mounting system according to claim 1, wherein a hollow space is disposed between the first track and the second track.

9. The photovoltaic module mounting system according to claim 8, wherein the hollow space is a hollow chamber.

10. The photovoltaic module mounting system according to claim 1, wherein the clamp includes a descending member extending from the base and an ascending member extending from the base in a direction substantially opposite a direction of the descending member.

11. The photovoltaic module mounting system according to claim 10, wherein the ascending member further includes a fin.

* * * * *